(12) United States Patent
Mathieu et al.

(10) Patent No.: US 8,514,101 B2
(45) Date of Patent: Aug. 20, 2013

(54) DRIVING MANEUVER ASSIST ON FULL WINDSHIELD HEAD-UP DISPLAY

(75) Inventors: Roy J. Mathieu, Rochester Hills, MI (US); Thomas A. Seder, Northville, MI (US); Joseph F. Szczerba, Grand Blanc, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 81 days.

(21) Appl. No.: 13/309,716

(22) Filed: Dec. 2, 2011

(65) Prior Publication Data

US 2013/0141250 A1    Jun. 6, 2013

(51) Int. Cl.
 *G08B 21/00* (2006.01)
(52) U.S. Cl.
 USPC .............................. 340/901; 340/438; 701/1
(58) Field of Classification Search
 USPC ............. 340/901–905, 435, 436, 438; 701/1, 701/300, 301
 See application file for complete search history.

(56) References Cited

U.S. PATENT DOCUMENTS

| | | | |
|---|---|---|---|
| 6,986,581 B2 | 1/2006 | Sun et al. |
| 7,090,355 B2 | 8/2006 | Liu et al. |
| 7,182,467 B2 | 2/2007 | Liu et al. |
| 7,213,923 B2 | 5/2007 | Liu et al. |
| 7,460,951 B2 | 12/2008 | Altan et al. |
| 2008/0158510 A1 | 7/2008 | Tant et al. |
| 2009/0268946 A1 | 10/2009 | Zhang et al. |
| 2010/0253489 A1 | 10/2010 | Cui et al. |
| 2010/0253492 A1 | 10/2010 | Seder et al. |
| 2010/0253493 A1 | 10/2010 | Szczerba et al. |
| 2010/0253526 A1 | 10/2010 | Szczerba et al. |
| 2010/0253539 A1 | 10/2010 | Seder et al. |
| 2010/0253540 A1 | 10/2010 | Seder et al. |
| 2010/0253541 A1 | 10/2010 | Seder et al. |
| 2010/0253542 A1 | 10/2010 | Seder et al. |
| 2010/0253543 A1 | 10/2010 | Szczerba et al. |
| 2010/0253593 A1 | 10/2010 | Seder et al. |
| 2010/0253594 A1 | 10/2010 | Szczerba et al. |
| 2010/0253595 A1 | 10/2010 | Szczerba et al. |
| 2010/0253596 A1 | 10/2010 | Szczerba et al. |
| 2010/0253597 A1 | 10/2010 | Seder et al. |
| 2010/0253598 A1 | 10/2010 | Szczerba et al. |
| 2010/0253599 A1 | 10/2010 | Szczerba et al. |
| 2010/0253600 A1 | 10/2010 | Seder et al. |
| 2010/0253601 A1 | 10/2010 | Seder et al. |
| 2010/0253602 A1 | 10/2010 | Szczerba et al. |
| 2010/0253688 A1 | 10/2010 | Cui et al. |
| 2010/0253918 A1 | 10/2010 | Seder et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |

OTHER PUBLICATIONS

U.S. Appl. No. 12/900,566, not publ'd, Szczerba et al.

(Continued)

*Primary Examiner* — Jeffery Hofsass

(57) ABSTRACT

A method to dynamically register a graphic on a driving scene of a source vehicle utilizing a graphic projection display includes monitoring source vehicle information and monitoring road information. A preferred driving maneuver and a driving scene location of the preferred driving maneuver are identified based on the monitored source vehicle information and the monitored road information. A graphic exemplifying the preferred driving maneuver is determined and a location of the graphic is dynamically registering upon the graphic projection display corresponding to the driving scene. The dynamically registered location is based on the driving scene location of the preferred driving maneuver. The graphic is displayed upon the graphic projection display.

19 Claims, 4 Drawing Sheets

(56) References Cited

OTHER PUBLICATIONS

U.S. Appl. No. 12/903,267, not publ'd, Seder et al.
U.S. Appl. No. 12/980,503, not publ'd, Szczerba et al.
U.S. Appl. No. 12/979,432, not publ'd, Szczerba et al.
U.S. Appl. No. 12/900,539, not publ'd, Seder et al.
U.S. Appl. No 12/980,522, not publ'd, Seder et al.
U.S. Appl. No. 12/980,612, not publ'd, Szczerba et al.
U.S. Appl. No. 12/981,026, not publ'd, Tsimhoni et al.
U.S. Appl. No. 12/981,602, not publ'd, Szczerba et al.
U.S. Appl. No. 12/982,478, not publ'd, Seder et al.
U.S. Appl. No. 13/239,667, not publ'd, Mathieu et al.
U.S. Appl. No. 13/312,045, not publ'd, Mathieu et al.
U.S. Appl. No. 13/309,691, not publ'd, Mathieu et al.
U.S. Appl. No. 13/356,695, not publ'd, Mathieu et al.

DRIVING MANEUVER ASSIST ON FULL WINDSHIELD HEAD-UP DISPLAY

TECHNICAL FIELD

This disclosure is related to dynamic registration of graphical images assisting preferred driving maneuvers.

BACKGROUND

The statements in this section merely provide background information related to the present disclosure and may not constitute prior art.

Vehicle information can include vehicle operation parameters and vehicle health parameters. Road information can include road geometry, vehicular traffic and road surface conditions. Preferred driving maneuvers can be performed during operation of the vehicle based on the vehicle and road information. In racing applications, preferred driving maneuvers can include performance enhanced driving maneuvers.

It is known, for example, to obtain the vehicle information by looking at vehicle instrument gauges on a vehicle dashboard or human machine interface. Further, the operator can obtain the road and driving environment information by viewing road geometry, vehicular traffic and road surface conditions through a windscreen corresponding to a driving scene of the vehicle. However, identifying the driving scene location to perform the preferred driving maneuver may be difficult for the operator of the vehicle to identify and lead to distracting the operator during operation of the vehicle or cause driving inefficient behaviors.

Head-up displays project light upon a screen and the light is converted into a viewable display upon the screen. Head-up displays are known to present information to the operator of the vehicle in an effective manner by reducing strain upon the operator by allowing the operator to reduce unnecessary eye scan and glance behavior to remain focused on driving and visual tracking.

SUMMARY

A method to dynamically register a graphic on a driving scene of a source vehicle utilizing a graphic projection display includes monitoring source vehicle information and monitoring road information. A preferred driving maneuver and a driving scene location of the preferred driving maneuver are identified based on the monitored source vehicle information and the monitored road information. A graphic exemplifying the preferred driving maneuver is determined and a location of the graphic is dynamically registering upon the graphic projection display corresponding to the driving scene. The dynamically registered location is based on the driving scene location of the preferred driving maneuver. The graphic is displayed upon the graphic projection display.

BRIEF DESCRIPTION OF THE DRAWINGS

One or more embodiments will now be described, by way of example, with reference to the accompanying drawings, in which.

DETAILED DESCRIPTION

Figure 1:
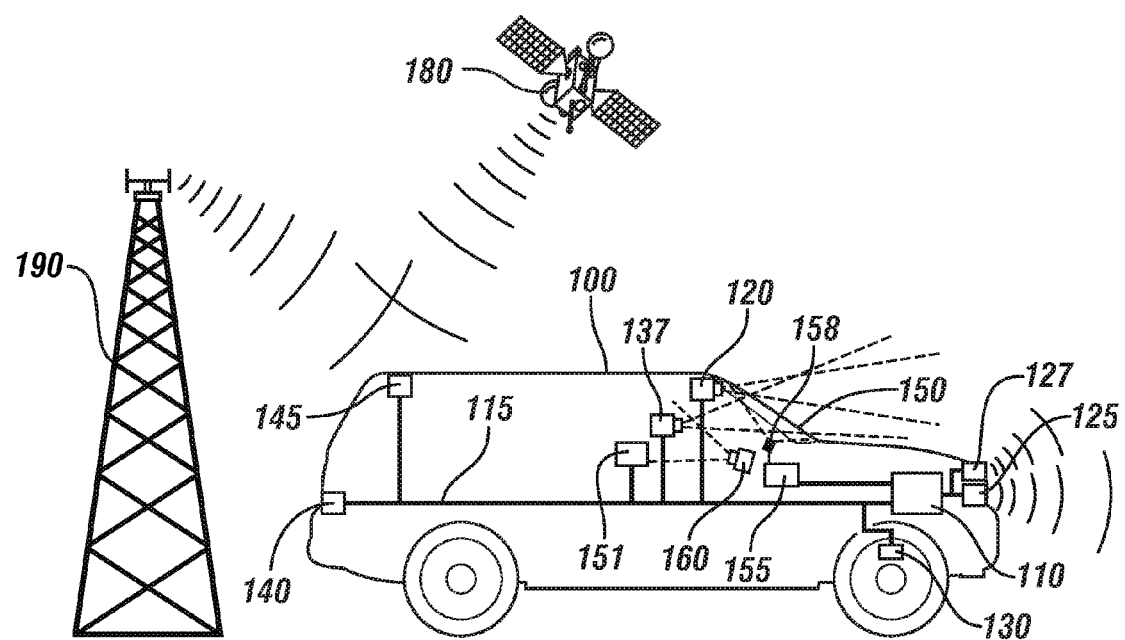
FIG. 1 illustrates an exemplary vehicle equipped with an enhanced vision system, in accordance with the present disclosure.

Referring now to the drawings, wherein the showings are for the purpose of illustrating certain exemplary embodiments only and not for the purpose of limiting the same, FIG. 1 illustrates an exemplary source vehicle equipped with an enhanced vision system (EVS), in accordance with the present disclosure. An exemplary EVS is disclosed in Copending U.S. application Ser. No. 12/417,077, which is incorporated herein by reference. For purposes of this disclosure, the terms "operator," "user," "race car driver," and "driver" may be used interchangeably herein. The vehicle 100 includes an EVS system manager 110; a graphic projection display 250 (shown in FIG. 2), vehicle sensor systems, including camera system 120 and radar system 125; vehicle operation sensors, including vehicle speed sensor 130; information systems, including GPS device 140 and wireless communication system 145; head-up display (HUD) 150; EVS graphics system 155; graphics projection system 158; and occupant eye location sensing system 160. The EVS system manager 110 includes a programmable processor including programming to identify a preferred driving maneuver and a driving scene location of the preferred driving maneuver and determine a graphic exemplifying the preferred driving maneuver. It will become apparent that the preferred driving maneuver can be utilized in car racing to perform performance enhanced driving maneuvers for improving the performance and safety of a vehicle operated on a closed course such as, for example, a race car operated on a competitive closed course. Preferred driving maneuvers can alternatively be utilized for indicating safety and non-safety maneuvers for novice and non-novice drivers. The EVS system manager can communicate directly with various systems and components, or the EVS system manager can alternatively or additionally communicate over a LAN/CAN system 115. Camera system 120 includes a camera or image capturing device taking periodic or sequential images representing a view from the vehicle. The camera or image capturing device of the camera system 120 preferably includes 360 degrees of coverage. Lidar system 127 includes a device known in the art utilizing scattered light to find range and/or other information of other vehicles located near the vehicle. IR imaging device 137 includes a device known in the art utilizing thermal imaging cameras to detect radiation in the infrared range of the electromagnetic spectrum and produce images of that radiation corresponding to other vehicles. Images from the IR imaging device 137 and the camera system 120 can be referred to as image data. Radar system 125 includes a device known in the art utilizing electromagnetic radiation to detect other vehicles or objects located near the vehicle. The radar system 125 and the lidar system 127 can be referred to as range sensors. A number of known in-vehicle sensors are used within a vehicle to monitor vehicle speed, engine speed, wheel slip, and other parameters representative of the operation of the vehicle. Vehicle speed sensor 130 represents one such an in-vehicle sensor, but the scope of the disclosure includes any such sensors for use by the EVS. GPS device 140 and wireless communication system 145 are devices known in the art for communicating with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces (e.g., non-transparent component 280 shown in FIG. 2) onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the vehicle 100 and a driving scene location, EVS system manager 110 can accurately dynamically register the graphical representations to the HUD 150 (i.e., graphic projection display 250) such that the occupant sees the images overlaid with visual images through the windscreen. Dynamic registration of graphics will be discussed in greater detail with reference to FIG. 4.

The EVS described above includes eye sensing and head sensing devices allowing estimation of eye location, allowing dynamic registration of images upon the graphic projection display 250 (e.g., HUD 150)) such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate dynamic registration of graphics upon the graphic projection display 250 (e.g., HUD 150) are contemplated, and the disclosure is not intended to be limited to the particular embodiments described herein.

Figure 2:
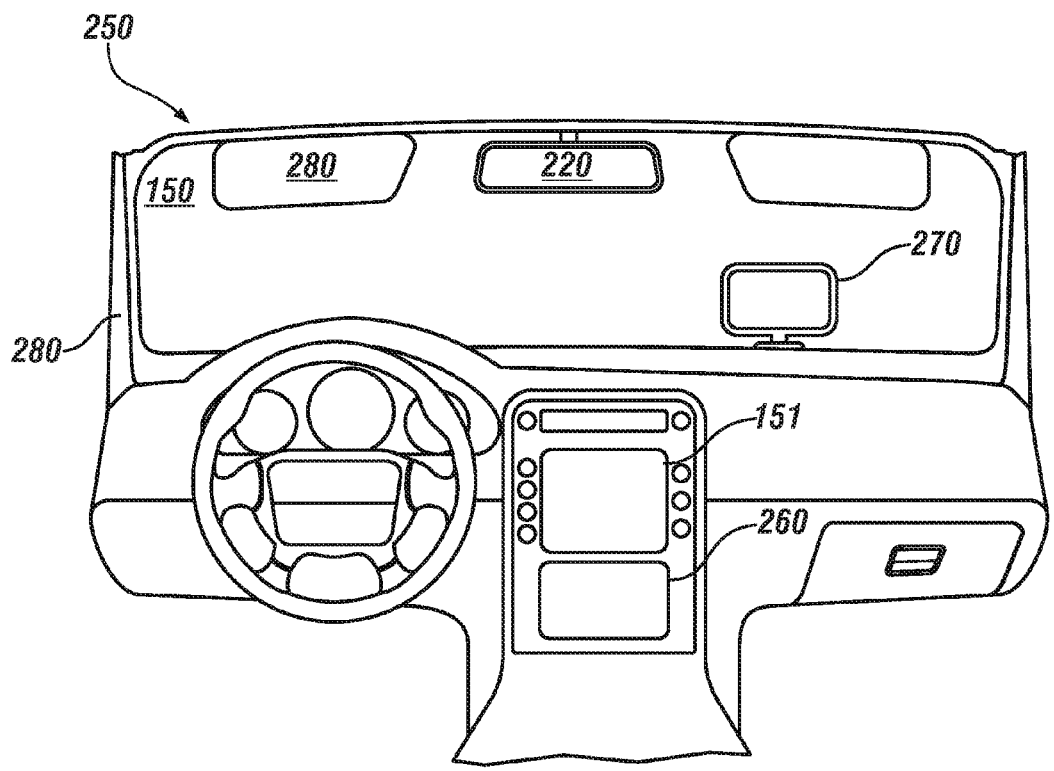
FIG. 2 illustrates graphic projection display embodiments where an image of a view corresponding to the driving scene of a vehicle and graphics can be displayed thereon, in accordance with the present disclosure.

An exemplary EVS includes a wide field of view, full windscreen HUD, a substantially transparent screen including functionality to display graphical images projected thereupon; a HUD image engine including a laser or lasers capable of projecting images upon the windscreen, wherein the windscreen is an embodiment of the graphic projection display 250 illustrated in FIG. 2; input sources deriving data concerning the operating environment of the vehicle; and an EVS system manager including programming to monitor inputs from the input devices, process the inputs, identify preferred driving maneuvers based on monitored vehicle and road information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS can operate without a vision system, for example, providing information available from only a GPS device, 3D map database, and in-vehicle sensors. In the alternative, it will be appreciated that an exemplary EVS can operate without access to a GPS device or wireless network, instead utilizing inputs only from a vision system and radar system. Many configurations are possible with the disclosed systems and methods, and the disclosure is not intended to be limited to the exemplary embodiments described herein.

FIG. 2 depicts the graphic projection display 250. The graphic projection display 250 includes embodiments where an image of a view corresponding to the driving scene of the vehicle and a graphic (i.e., graphic exemplifying the preferred driving maneuver) can be displayed thereon. The graphic projection display 250 includes the substantially transparent windscreen HUD 150, a touch screen display 260, a human machine interface (HMI) 151 having a display, non-transparent components 280 and a display monitor 270 mounted within the interior of the vehicle. It will be understood that all of the embodiments included with the graphic projection display 250 can project an image of a view corresponding to the driving scene of the vehicle. The driving scene can be depicted from the camera system 120. However, the image of the view of the driving scene need not be projected upon the substantially transparent windscreen HUD because the actual driving scene is visible through the HUD 150. Identifying the preferred driving maneuver and determining the graphic exemplifying the preferred driving maneuver will be discussed in further detail in FIG. 5. It will be understood that the vehicle will typically require one of the embodiments of the graphic projection display 250 for displaying a view corresponding to the driving seen thereupon. However, in alternative embodiments, the graphic projection display 250 could include a combination of the embodiments utilized by the vehicle 100. For instance, an image corresponding to the driving scene of the vehicle could be displayed upon both the HMI 151 and the touch screen display 260.

Figure 3:
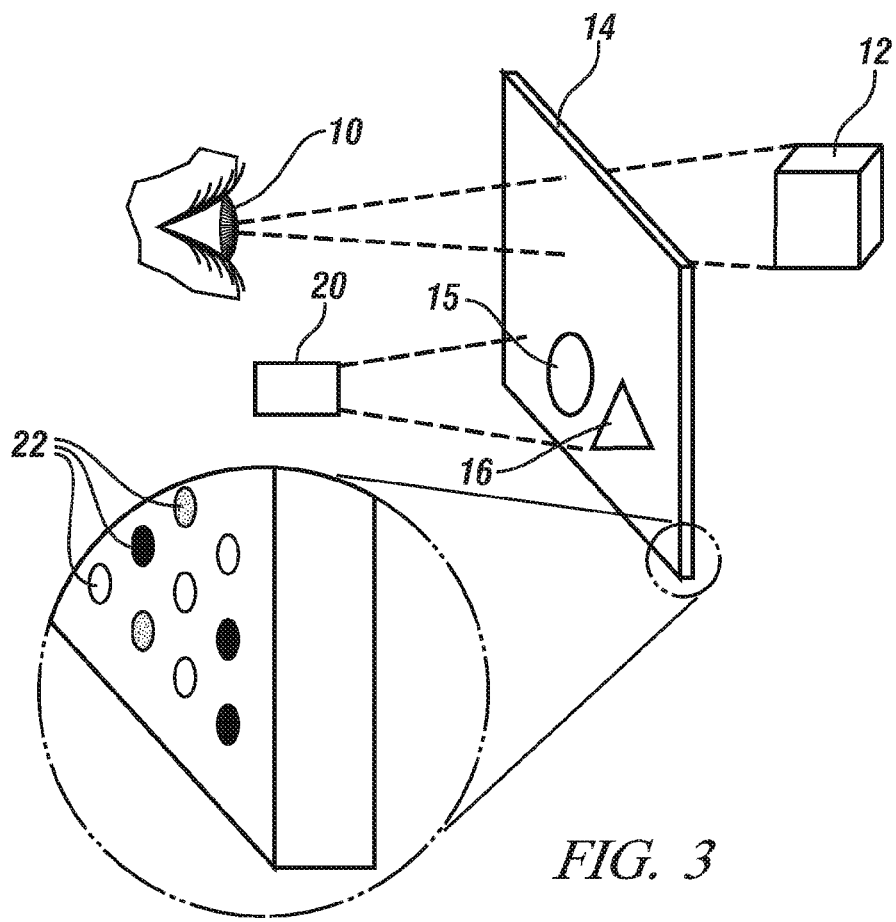
FIG. 3 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 3 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 3 illustrates illumination of substrate 14 with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. The projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. The projector may be a liquid crystal display (LCD) projector. The projector may be a liquid crystal on silicon (LCOS) projector. The projector may be an analog projector (e.g. a slide film projector or a movie film projector). A person having ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 3 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 3 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 3, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. Each of the light emitting particles may have a diameter that is less than about 300 nanometers. According to embodiments, each of the light emitting particles has a diameter that is less than about 200 nanometers, less than about 100 nanometers, or less than about 50 nanometers. The light emitting particles may be individual molecules.

Similarly, the graphic projection display can include side and rear windows of the vehicle. It will be further understood that graphics can be displayed in a manner such that they can be oriented and interpreted from outside a vehicle. Therefore, a graphic exemplifying a preferred driving maneuver can be oriented to outside the vehicle. For example, a projector within the vehicle could project graphics viewable upon the windscreen from another vehicle to the side of the vehicle, with the projected graphic exemplifying the preferred driving maneuver such that the other vehicle is aware of the preferred driving maneuver that the vehicle is anticipated to perform.

In another embodiment, the graphic projection display 250 can include the HMI device 151 having the display associated therewith for receiving a projected image of a view corresponding to the driving scene of the vehicle and displaying a graphic exemplifying the preferred driving maneuver thereon. HMI 151 includes a computing device where the operator of the vehicle can input commands to control various systems of the vehicle in signal communication with the HMI 151 and receive desirable information. Methods of projection upon HMI displays are known in the art and this disclosure is not meant to be limited to any one method of projection.

In another embodiment, the graphic projection display 250 can include the touch screen display 260 for receiving a projected image of a view corresponding to the driving scene of the vehicle and displaying a graphic exemplifying the preferred driving maneuver thereon. The touch screen display 260 can be the display associated with the HMI device 151 or may be a separate display located within the vehicle. Methods of projection upon touch screen displays are known in the art and this disclosure is not meant to be limited to any one method of projection.

In another embodiment, the graphic projection display 250 can include the display monitor 270 for receiving a projected image of a view corresponding to the driving scene of the vehicle and displaying a graphic exemplifying the preferred driving maneuver thereon. The display monitor 270 can be mounted on the vehicle dashboard or located somewhere in the vehicle convenient for viewing by the operator. The display monitor 270 can include a monitor associated with a computer utilized in police vehicles.

In another embodiment, the graphic projection display 250 can include the non-transparent components 280 for receiving a projected image of a view corresponding to the driving scene of the vehicle and displaying a graphic exemplifying the preferred driving maneuver thereon. The non-transparent components 280 can include a dashboard, seats, headrests, structural pillars, roofs, sun visors and steering wheels. The non-transparent components 280 can include a transparent phosphor film reactive to display graphics in response to an excitation projector. Co-pending U.S. application Ser. No.

12/563,407, which is incorporated herein by reference, discloses projecting images and graphics upon non-transparent components.

Figure 4:
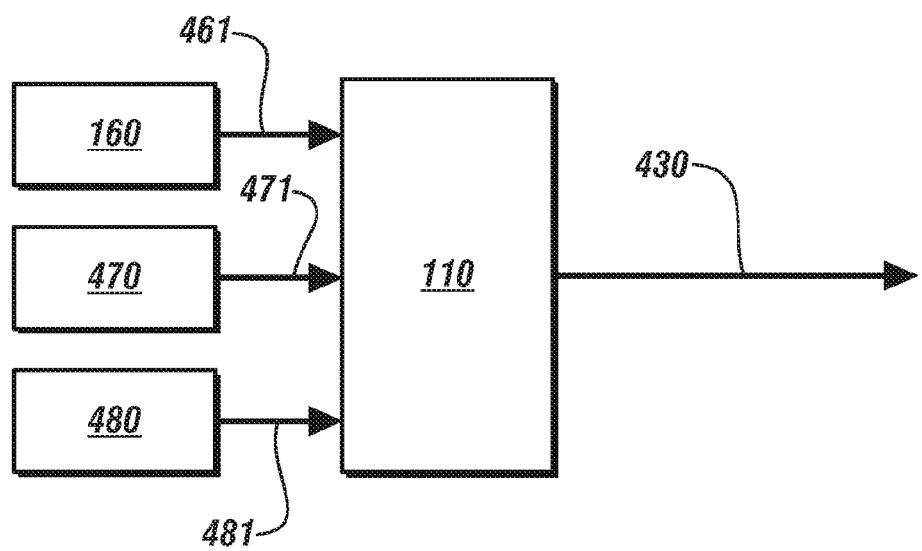
FIG. 4 illustrates an exemplary information flow for dynamically registering a graphic on a driving scene utilizing the graphic projection display, in accordance with the present disclosure.

FIG. 4 illustrates an exemplary information flow for dynamically registering a graphic on a driving scene utilizing the graphic projection display 250 including an EVS system manager 110 monitoring inputs from the occupant eye location sensing system 160, inputs from a vehicle location and orientation module 470 and inputs from a driving scene location module 480 to thereby generate display requirements 430, in accordance with the present disclosure. The graphic can include a graphic exemplifying a preferred driving maneuver.

With reference to FIGS. 1 and 4, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail herein. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming. An eye location input 461 is input to the EVS system manager 110.

A current location and orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current location and orientation can also be determined by vehicle kinematics including at least vehicle speed and yaw rate, available through sensors monitoring vehicle operation and/or monitoring accelerometer readings. Further, vehicle heave, pitch, roll, yaw and warp rates can be taken into account when determining the current orientation of the vehicle. Utilizing the methods discussed above, the vehicle location and orientation module 470 generates a vehicle location and orientation input 471 to the EVS system manager 110.

The driving scene location module 480 can monitor the driving scene location of the preferred driving maneuver. For instance, a driving scene location of approaching performance maneuver point, such as a turn-in point for a race car, can be monitored by the driving scene location module 480. In other words, the driving scene location of the preferred maneuver refers to a location along a road at which the preferred driving maneuver is to be performed. The driving scene location module 480 can utilize any of the aforementioned in-vehicle sensors discussed above in unison, or in combination with one another, to determine the driving scene location of the preferred maneuver. It will be appreciated that data obtained from a plurality of vehicle sensors and data modules 506, discussed in greater detail in FIG. 5, can be utilized by the driving scene location module 480 to monitor the driving scene location of the preferred driving maneuver. The driving scene location module 480 generates a driving scene location input 481 to the EVS system manager 110.

The EVS system manager thereby monitors the eye location input 461, the vehicle location and orientation input 471 and the driving scene location input 481 to thereby generate the display requirements 430 for dynamically registering the graphic upon the graphic projection display 250.

Therefore, based on the occupant eye location, the current location and orientation of the vehicle and a driving scene location, an estimated point of intersection between a driving scene location of a preferred driving maneuver the operator desires to view and the operator's eyes can be determined upon the display, thereby enabling graphical images to by dynamically registered to a location upon the display corresponding to the driving scene of the vehicle, such that the occupant of the vehicle can view the driving scene and the graphic exemplifying the preferred driving maneuver.

Further embodiments envisioned include monitoring data related to an operator gaze location and dynamically updating the graphic exemplifying the preferred driving maneuver based on the operator gaze location. For instance, emphasis can be added to the graphic based on an increasing distance between the operator gaze location and the location at which the graphic is registered upon the graphic projection display. Likewise, emphasis can be decreased to the graphic based on a decreasing distance between the operator gaze location and the location at which the graphic is registered upon the graphic projection display.

Further embodiments envisioned include dynamically updating the graphic exemplifying the preferred driving maneuver based on the location and orientation of the vehicle. For instance, the dynamically updating can include adding emphasis to the graphic based on a decreasing distance between the vehicle and the location of the preferred driving maneuver. In a non-limiting example, the adding emphasis to the graphic can include increasing the size of the graphic as the distance between the vehicle and the location of the preferred driving maneuver decreases. For instance, a graphic that includes a downward arrow exemplifying an upcoming transmission-downshift point can increase in size the nearer the vehicle is to the transmission-downshift point. In another non-limiting example, the adding emphasis to the graphic can include increasing the illumination of the graphic. For instance, the graphic exemplifying the upcoming transmission-downshift point in the previous example can include increasing the illumination of the downward arrow the nearer the vehicle is to the transmission-downshift point.

Figure 5:
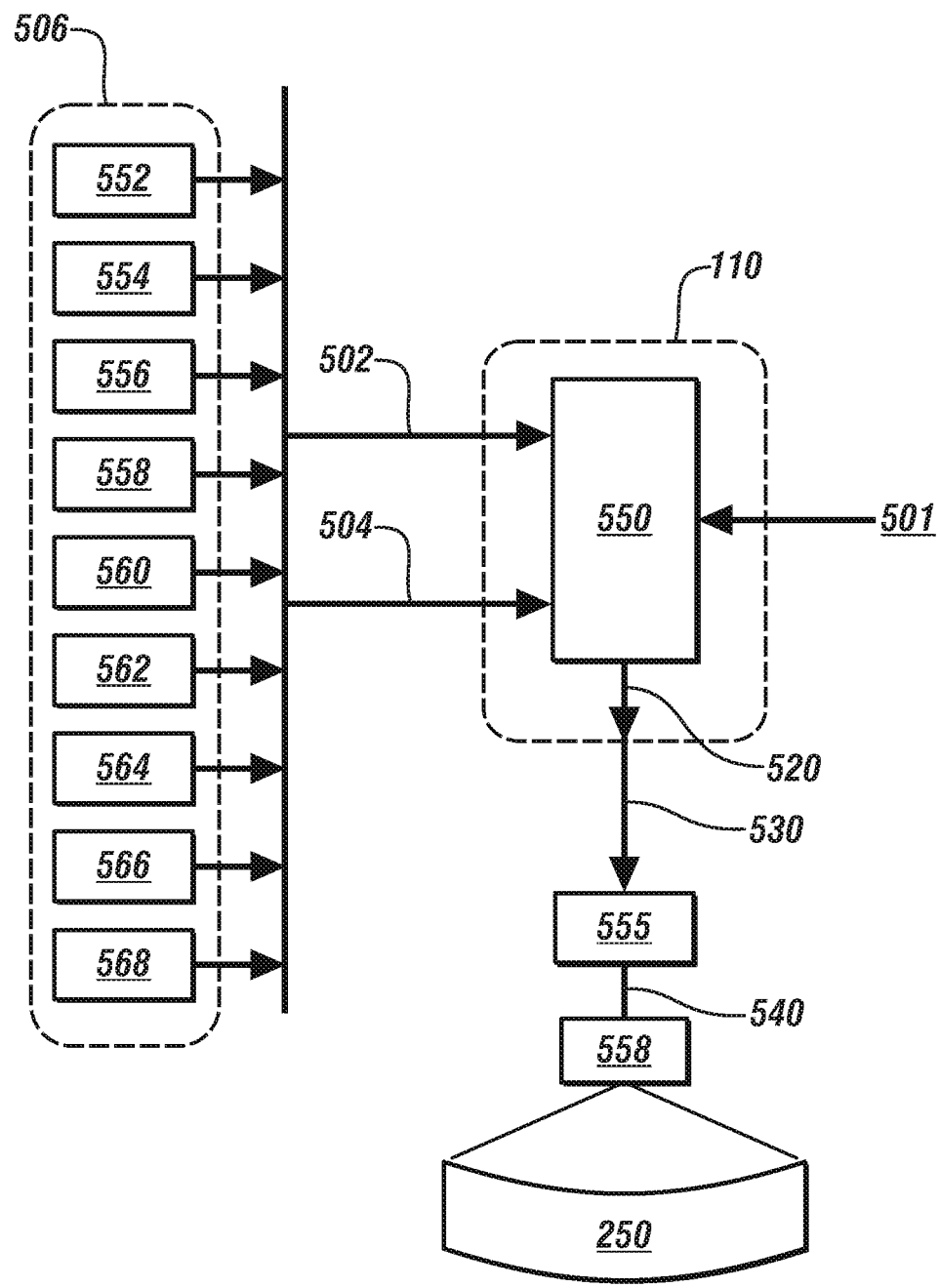
FIG. 5 illustrates an exemplary information flow to determine a graphic exemplifying a preferred driving maneuver, in accordance with the present disclosure.

Referring to FIG. 5, a schematic depiction of an exemplary information flow to determine a graphic exemplifying a preferred driving maneuver and a driving scene location of the preferred driving maneuver where the graphic is dynamically registered and displayed upon a graphic projection display 250 corresponding to the driving scene of the vehicle. The information flow includes an EVS system manager 110 monitoring information from various sources and generating display requirements 530, graphics module 555 monitoring the display requirements 530 from the EVS system manager and generating graphics commands 540, and a graphics projection display 250. As aforementioned, the graphic projection display 250 can include the substantially transparent windscreen head-up display 150, the non-transparent components 280, the vehicle touch screen 260, the HMI device 151, the display monitor 270 or any screen or display displaying projected graphics and an image of a view corresponding to the road scene of the vehicle. It is appreciated that the graphic projection display 250 is not meant to be limited to any of the above displays. Graphic projection module 558 projects light upon the graphic projection display 250.

The EVS system manager 110 includes and monitors a preferred driving maneuver module (PDMM) 550. Monitoring the PDMM 550 includes monitoring vehicle information and road information inputs 502,504, respectively. The PDMM 550 analyzes the monitored vehicle information and road information inputs 502,504, respectively, and identifies a preferred driving maneuver and a driving scene location of the preferred driving maneuver. The identified preferred driving maneuver can further be based upon a user input 501, discussed in further detail below. A graphic 520 exemplifying the preferred driving maneuver corresponds to a location on the driving scene at which the preferred driving maneuver is located upon the driving scene. The graphic 520, once displayed, can be communicated between the operator of the vehicle, a front-seat occupant and rear seat occupants.

The graphics module 555 utilizing the display requirements 530 generated by the EVS system manager 110 and based upon the graphic 420 representing the user-defined content, generates the graphic 520 as a graphics command 540 to the graphics projection module 558. It will be appreciated that the display requirements 530 include dynamically registering a location of the graphic upon the graphic projection display corresponding to the driving scene of the vehicle. Dynamically registering the graphic upon the graphic projection display corresponding to the driving scene is discussed above and will not be discussed in detail herein. The graphics projection module 558 displays the graphic onto the driving scene of the vehicle utilizing the graphic projection display 250. It will be further appreciated that the graphic module 555 and the graphic projection module 558 correspond to the EVS graphics engine 155 and the graphic projection system 158, respectively.

The vehicle information and road information inputs 502, 504, respectively, are generated from a plurality of vehicle sensors and data modules 506 to monitor vehicle operation and road information. It will be understood that each of the plurality of vehicle sensors and data modules 506 can be utilized alone or in unison with other sensors and data modules depending on the application in monitoring the vehicle information and the road information to generate the vehicle information and the road information inputs 502, 504, respectively, utilized by the PDMM 550 to identify the preferred driving maneuver and the road scene location of the preferred driving maneuver. The PDMM 550 subsequently determines the graphic 520 exemplifying the identified preferred driving maneuver.

The plurality of data sensors and data modules 506 can include an in-vehicle module 552 configured to monitor vehicle operation including vehicle health parameters and vehicle operation parameters. The vehicle health parameters can include, but are not limited to fuel economy, oil levels, engine temperature, tire condition, brake condition, suspension condition and clutch condition. The vehicle operation parameters can include, but are not limited to, vehicle and engine speed and vehicle transmission state. The in-vehicle module 552 can include the aforementioned known in-vehicle sensors used within the vehicle to monitor the vehicle health parameters, the vehicle operation parameters and other parameters representative of the operation of the vehicle.

The plurality of vehicle sensors and data modules 506 can further include sensors and data modules for monitoring the vehicle and road information including data from a range module 554, data from a vision module 556 capable of capturing images with 360 degrees of rotation, data from an IR imaging module 558, data from a vehicle-to-vehicle module 560, data from a vehicle history module (VHM) 562, data from a wireless communications module (WCM) 564, data form a stored data module (SDM) 566 and data from a vehicle location and orientation module 568. The vehicle location and orientation module can correspond to the vehicle location and orientation module 470 of FIG. 4.

The data from the range module 554 can include range data from the radar system 125 and the lidar system 127 of FIG. 1, respectively. Likewise, the vision data can be referred to as vision or image data from the camera system 120 of FIG. 1. The IR imaging data can be referred to as image data from the IR imaging device 137 of FIG. 1. The data from the vehicle-to-vehicle module 560, also referred to as vehicle-to-vehicle communication, includes utilizing GPS and 3D map data, the wireless communication system 145, the satellite system 180 and the cellular communications tower 190. The VHM 562 includes previously traveled routes or laps by the vehicle and preferred driving maneuvers identified along the previous traveled routes or laps, wherein the identity and driving scene location of the preferred driving maneuvers is recorded and stored in memory. The WCM 564 can include data input from a source outside the vehicle such as a crew chief relating vehicle and road information to the operator. The SDM 566 can include data pertinent to the road or closed course the vehicle is traveling. The data from the SDM 566 can be stored on a USB thumb drive or pre-loaded on a hard drive associated with the EVS system manager 110. For instance, the SDM 566 can include a particular closed course 3D map data that a vehicle is racing on and the location of performance enhanced driving maneuvers (e.g., preferred driving maneuvers), such as transmission-downshift points along the particular closed course.

In another exemplary embodiment, the identified preferred driving maneuver can be user-defined and user-specified according to the user input 501. The user-input defining and specifying the preferred driving maneuver can be carried out as an input to the HMI device 151 utilizing a keyboard, mouse, joystick, controller, gesturing and/or voice commands in an exemplary embodiment. In other words, the user input 501 can categorize and organize which preferred driving maneuvers the operator of the vehicle desires to view as the graphic 520 upon the graphic projection display 250. For instance, the preferred driving maneuver may be user-defined and user-selected to include lane changes to meet an estimated time of arrival. In other examples, the preferred driving maneuver can be user-defined and user-selected by the operator to only include performance maneuver points, such as acceleration points, if an operator of a race car desires to be prompted of the driving scene location of where the most optimal road scene location is to accelerate along the closed course.

The monitored road information (e.g., road information inputs 504) can include monitoring road geometry. Monitored road geometry can include, but is not limited to, intersections, speed limit changes, lane endings, passing lanes, turns, bridges, school zones and limited sight. Similarly, the monitored road information (e.g., road information inputs 504) can include monitoring closed course specific information including closed course curves, turns, lane markers, surface material, grade, view points, pit locations and start and finish locations. The monitored road information can further include monitoring vehicular traffic, or competing race cars in racing embodiments, within the operational environment of the vehicle. It will be appreciated that monitoring vehicular traffic may be important in order to avoid identifying preferred driving maneuvers that may be a risk to vehicle safety if vehicular traffic is present. Monitoring road information can include monitoring road surface conditions. The road surface conditions can take into account the material of the road surface and adverse road surface conditions affecting vehicle drivability such as rain, ice, snow, debris, gravel, or any slippery road conditions. In an exemplary embodiment of the present disclosure, the identified preferred driving maneuver can be dynamically updated based on the monitored adverse road surface conditions. For instance, an identified preferred driving maneuver that includes a braking point may be dynamically updated to merely include a deceleration point because ice on the road has been detected by at least one of the plurality of sensors and data modules 506, where a sudden braking may cause the vehicle to spin out of control.

Embodiments envisioned include monitoring vehicle information including at least one of a vehicle location and orientation and vehicle health parameters and monitoring road information including road geometry. A preferred driving maneuver can be identified that includes a braking point. In a non-limiting example, a driver arriving at a restaurant may desire valet parking where a graphic that includes a brake point indicating that the driver should stop the vehicle to valet the driver's car may be dynamically registered upon the windscreen head-up display of the vehicle. In another non-limiting example, monitored vehicle health parameters may indicate that a vehicle engine temperature or battery temperature is too high where a graphic that includes a brake point indicating that the driver should stop in a shady location based on monitored road geometry and a vehicle location and orientation may be dynamically registered upon the windscreen head-up display of the vehicle.

Further embodiments envisioned include monitoring vehicle information including a vehicle location and orientation and monitoring road information including road geometry. A preferred driving maneuver can be identified that includes lane keeping or lane changing based on the monitored vehicle location and orientation and the monitored road geometry. In a non-limiting example, a novice driver on a cross country trip may desire to stay between the lanes during a heavy down poor where a graphic that includes lane markings can be dynamically registered and displayed upon the windscreen head-up display of the vehicle.

Further embodiments envisioned include monitoring vehicle operation parameters including vehicle speed, engine speed and transmission state and monitoring road information including road geometry and identifying a preferred driving maneuver that includes a performance maneuver point based on the monitored road geometry. The performance maneuver point can include at least one of an acceleration point, a deceleration point, a braking point, a turn-in point and a transmission shift point based on the monitored vehicle operation parameters. For instance, if a race car is traveling lower than a desired speed, the performance maneuver point can include the acceleration point and a transmission-downshift. Likewise, monitored vehicle information can further include vehicle health, wherein a performance maneuver point that includes a turn-in point may further include a braking point if it has been determined that the tires are not in good condition in order to reduce wear from higher speed turns.

Further embodiments envisioned include monitoring vehicle operation parameters including vehicle speed, engine speed and transmission state and monitoring road information including road geometry and identifying a preferred driving maneuver that includes a collision avoidance maneuver point based on the monitored road geometry. The monitored road geometry can include other vehicles (e.g., race cars), road surface conditions, road debris and other hazardous conditions that could potentially cause a collision. The collision avoidance maneuver can include a steering maneuver, acceleration point, a yield point, a stop point point and a transmission shift point based on the monitored road geometry and the monitored vehicle operation. In a non-limiting example, an accident scene ahead of a race car can be avoided by a collision avoidance maneuver that includes a graphic exemplifying a veer to the right-side of the track and decelerate vehicle speed to avoid the accident scene.

Further embodiments include monitoring a location and orientation of another vehicle of interest to the source vehicle (i.e. a principle vehicle) along a route traveled by the vehicle based on vehicle-to-vehicle communication and monitoring a location and orientation of the vehicle based on the monitored vehicle information (e.g., vehicle information inputs 502). A proximity of the principle vehicle in relation to the vehicle is determined based on the monitored location and orientation of the principle vehicle and the monitored location and orientation of the vehicle. The identified preferred driving maneuver can be based on the proximity. For instance, a graphic can be displayed that included an arrow indicating that the driver should veer to the right or left of the roadway. The graphic can further pulsate to indicate that the principle vehicle is very close to the vehicle. In a non-limiting example, the principle vehicle can include an ambulance where a graphic can be projected upon the substantially transparent windscreen head-up display indicating that the driver should veer off to the shoulder of the roadway and stop so that the ambulance can pass thru. In another non-limiting example, the principle vehicle can include a school bus where a graphic can be projected upon the substantially transparent windscreen head-up display indicating that the driver should remain a predetermine distance away from the school bus.

Further embodiments envisioned include monitoring a location and orientation for each of a plurality of other competing vehicles on a closed course based on vehicle-to-vehicle information and monitoring a location and orientation of the vehicle based on the monitored vehicle information (e.g., vehicle information inputs 502). A lap position for the vehicle and each of the competing vehicles can be determined based on the locations and orientations. The identified preferred driving maneuver can be based on the lap positions. For instance, an identified preferred driving maneuver may be to increase speed if a competing vehicle with a better lap time is near. Likewise, a preferred driving maneuver may be to change lanes to allow competing vehicles ahead in the race to safely pass.

In another exemplary embodiment of the present disclosure, vehicle operation and vehicle health parameters can be monitored based on monitored vehicle information. A preferred vehicle operation can be determined based on the vehicle health parameters and compared with the monitored vehicle operation. An adjusted vehicle operation based on the comparing can be determined and a second graphic exemplifying the adjusted vehicle operation can be determined. The second graphic can be displayed upon a substantially transparent rear window display. In an alternative embodiment, the second graphic can be displayed on any of the displays of the graphic projection display 250 illustrated in FIG. 2. In a non-limiting example, the monitored vehicle operation can include a current speed of the vehicle and a preferred vehicle operation can include a preferred vehicle speed based on vehicle health parameters including optimum fuel economy. The current vehicle speed can be compared to the preferred vehicle speed. If the comparing indicates a deviation, an adjusted vehicle operation can include an amount the current vehicle speed needs to be adjusted to achieve the preferred vehicle speed. A graphic exemplifying the adjusted vehicle speed can be projected upon the rear window of the vehicle. For instance, a downward arrow can be projected if the current vehicle speed is faster than the preferred vehicle speed.

The graphic exemplifying the identified preferred driving maneuver can include a geometric shape corresponding to the preferred driving maneuver such as curved arrows for turns, upward and downward arrows for up- and downshifts, respectively, and triangles for acceleration and deceleration points.

In another exemplary embodiment, the graphic can include a highlighted road segment corresponding to the driving scene location of the preferred driving maneuver. For instance, the segment of road corresponding to the driving scene location where the preferred driving maneuver includes an acceleration point can include highlighting that segment a color such as green. In another exemplary embodiment, the graphic can include a textual graphic exemplifying the preferred driving maneuver.

It will be appreciated that methods known in the art can be utilized to determine a historical vehicle operation profile during a route traveled by the vehicle. The historical vehicle operation profile can be determined by monitoring the location and orientation of the vehicle and monitoring vehicle operation. The monitored vehicle operation can be user-defined and/or user-selected and can include, but is not limited to, monitoring vehicle speed, vehicle acceleration/deceleration, steering, transmission shifting, braking, racing lines and lap positions/times. Accordingly, the historical vehicle operation profile can be recorded and stored in on-board and/or off-board databases, where a playback of the historical vehicle operation profile can be viewed. Further, a preferred vehicle operation profile can be predetermined or determined based on the monitored location and orientation of the vehicle and the monitored vehicle operation. It will be recognized that the preferred vehicle operation profile can correspond to ideal or optimum vehicle performance for the same route traveled by the vehicle having the historical vehicle operation profile. As such, the historical vehicle operation profile and the preferred vehicle operation profile can be compared. The comparing can be accomplished by methods known in the art such as time stamping and/or matching geographical coordinates. For instance, historical vehicle operation at a given vehicle location and orientation can be compared to preferred vehicle operation performance at the same vehicle location and orientation. In a non-limiting example, a historical vehicle operation profile consisting of transmission-shift points can be determined for a lap around a closed course, where the historical vehicle operation profile can be compared to a preferred vehicle operation profile consisting of ideal or optimum transmission-shift points for the same lap around the closed course. In the non-limiting example, the comparing can be conducted at a later time, such as after a race or training session, for purposes of educating the operator of when and where ideal or optimum transmission-shift points were either accomplished or missed by the operator. Similarly, in the non-limiting example, the comparing can be conducted during vehicle operation to serve as an initial set of driving maneuver prompts.

Figure 6:
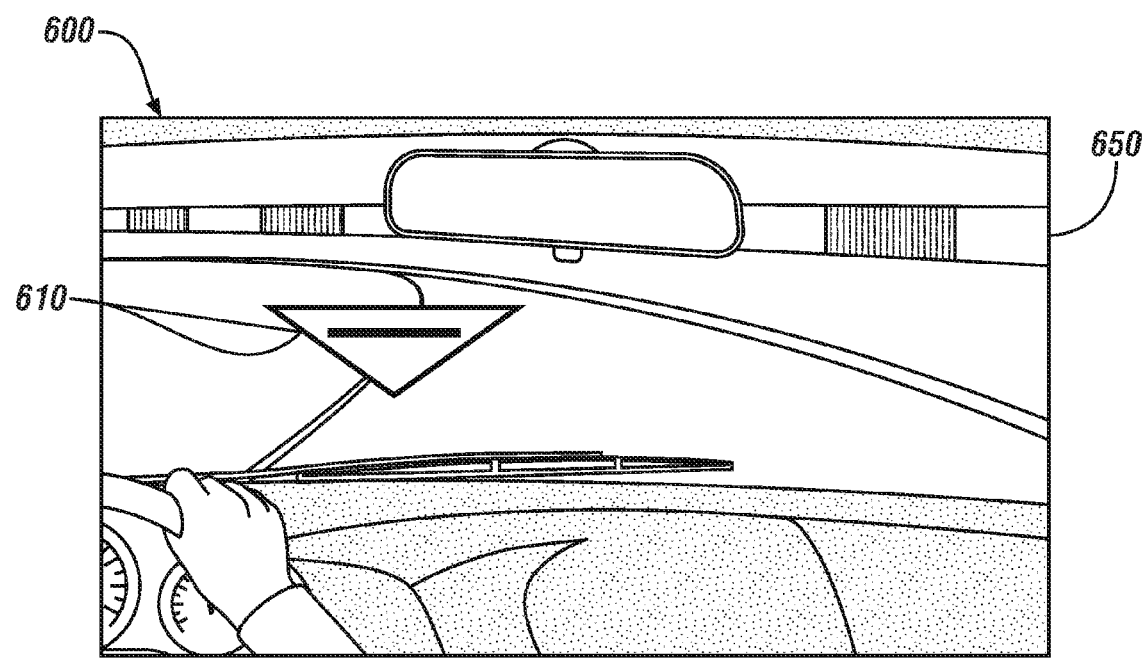
FIGS. 6 and 7 illustrate a driving scene including a graphic exemplifying a preferred driving maneuver upon a substantially transparent windscreen head up display, in accordance with the present disclosure.

Referring to FIG. 6, a driving scene 600 is illustrated through a substantially transparent windscreen head-up display 650 of a vehicle. A graphic 610 exemplifying a preferred driving maneuver is dynamically registered to a preferred location upon the head-up display 650 of the vehicle. Specifically, the graphic 610 exemplifies a performance enhanced driving maneuver indicating a driving scene location of where an operator of a racing vehicle (i.e., race car) should brake (e.g., a braking point). The graphic 610 can include a textual message indicating the prompt to brake, and also include a color, such as red, indicating the braking point.

Figure 7:
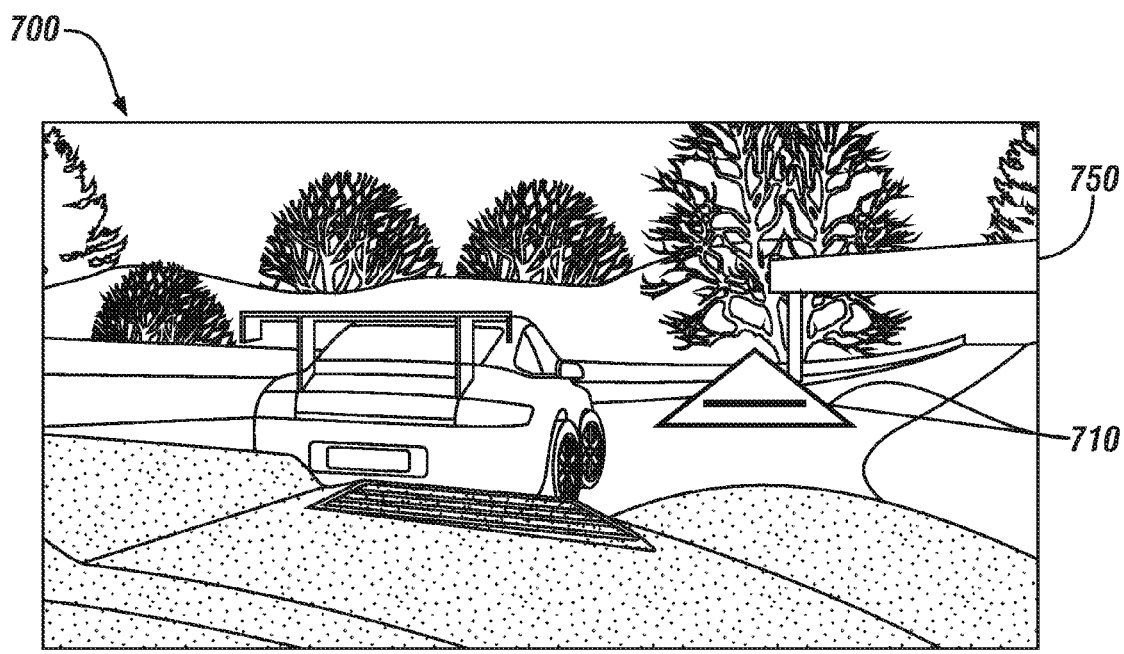

Referring to FIG. 7, a driving scene 700 is illustrated through a substantially transparent windscreen head-up display 750 of a vehicle. A graphic 710 exemplifying a preferred driving maneuver is dynamically registered to a preferred location upon the head-up display 750 of the vehicle. Specifically, the graphic 710 exemplifies a performance enhanced driving maneuver indicating a driving scene location of where an operator of a racing vehicle (i.e., race car) should accelerate (e.g., an acceleration point). The graphic 710 can include a textual message indicating the prompt to accelerate, and also include a color, such as green, indicating the acceleration point.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic on a driving scene of a source vehicle utilizing a graphic projection display, comprising:
  monitoring source vehicle information;
  monitoring road information;
  identifying a preferred driving maneuver and a driving scene location of the preferred driving maneuver based on said monitored source vehicle information and said monitored road information;
  determining a graphic exemplifying the preferred driving maneuver;
  dynamically registering a location of the graphic upon the graphic projection display corresponding to the driving scene, the dynamically registered location based on the driving scene location of the preferred driving maneuver; and
  displaying the graphic upon the graphic projection display.

2. The method of claim 1 wherein the graphic projection display comprises a substantially transparent windscreen head-up display comprising one of light emitting particles and microstructures over a predefined region of the windscreen permitting luminescent display while permitting vision therethrough.

3. The method of claim 1 wherein the graphic projection display comprises one of a touch screen display, a human machine interface display, a non-transparent component and a display monitor, said method further comprising projecting an image of a view corresponding to the driving scene of the source vehicle upon the graphic projection display.

4. The method of claim 1 further comprising monitoring an occupant eye location wherein the dynamically registered location is further based upon the occupant eye location.

5. The method of claim 4 further comprising:
  monitoring an operator gaze location; and
  dynamically updating the graphic exemplifying the preferred driving maneuver based on the operator gaze location comprising one of,
    increasing emphasis to the graphic based on an increasing distance between the operator gaze location and the location at which the graphic is registered upon the graphic projection display, and
    decreasing emphasis to the graphic based on a decreasing distance between the operator gaze location and the location at which the graphic is registered upon the graphic projection display.

6. The method of claim 1 further comprising:
  determining a location and an orientation of the source vehicle based on the monitored source vehicle information; and
  dynamically updating the graphic exemplifying the preferred driving maneuver based on the location and orientation of the source vehicle, comprising increasing emphasis to the graphic based on a decreasing distance between the source vehicle and the location of the preferred driving maneuver, wherein increasing emphasis comprises at least one of increasing the size of the graphic and increasing the illumination of the graphic.

7. The method of claim 1 wherein said monitored source vehicle information comprises source vehicle health parameters selected from the group consisting of a fuel economy, an oil level, an engine temperature, a tire condition, a brake condition, a suspension condition and a clutch condition.

8. The method of claim 1 wherein said monitored road information comprises adverse road surface conditions, and wherein said preferred driving maneuver is dynamically updated based upon said adverse road surface conditions.

9. The method of claim 1 wherein said monitored source vehicle information comprises at least one of a source vehicle location and orientation and source vehicle health parameters, wherein said monitored road information comprises road geometry and wherein said preferred driving maneuver comprises a stop point based on at least one of said source vehicle location and orientation, said source vehicle health parameters and said road geometry.

10. The method of claim 1 wherein said monitored source vehicle information comprises a source vehicle location and orientation, wherein said road information comprises road geometry and said preferred driving maneuver comprises at least one of lane keeping and lane changing based on said source vehicle location and orientation and said road geometry.

11. The method of claim 1 wherein said monitored source vehicle information comprises source vehicle operation parameters including a source vehicle speed, an engine speed and a source vehicle transmission state.

12. The method of claim 11 wherein said monitored road information comprises road geometry and said preferred driving maneuver comprises one of:
    a collision avoidance maneuver based on the road geometry and the monitored vehicle information; and
    a performance maneuver point based on the monitored road geometry and comprising at least one of an acceleration point, a deceleration point, a braking point, a turn-in point and a transmission shift point based on said vehicle operation parameters.

13. The method of claim 1 further comprising:
    monitoring a location and orientation of a principle vehicle along a route traveled by the source vehicle based on vehicle-to-vehicle information;
    monitoring a location and orientation of the source vehicle based on the monitored source vehicle information; and
    determining a proximity of said principle vehicle in relation to said source vehicle based on the monitored location and orientation of the principle vehicle and the monitored location and orientation of the source vehicle, wherein said preferred driving maneuver is further based on said proximity.

14. The method of claim 1 further comprising:
    monitoring a respective location and orientation of each of a plurality of competing race vehicles on a closed course based on vehicle-to-vehicle information;
    monitoring a location and orientation of the source vehicle based on said monitored source vehicle information; and
    determining a respective lap position for said source vehicle and for each of said competing race vehicles based on said respective monitored locations and orientations, wherein said preferred driving maneuver is further based on said lap positions.

15. The method of claim 1 wherein the graphic comprises at least one of a geometric shape corresponding to the preferred driving maneuver, a highlighted road segment corresponding to the driving scene location of the preferred driving maneuver and a textual graphic.

16. The method of claim 1 wherein the preferred driving maneuver and the driving scene location of the preferred driving maneuver is user-defined and user-specified according to a user input.

17. The method of claim 1 further comprising:
    monitoring source vehicle operation and source vehicle health parameters based on said monitored source vehicle information;
    determining a preferred source vehicle operation based on said source vehicle health parameters;
    comparing the monitored source vehicle operation and the preferred source vehicle operation;
    identifying an adjusted source vehicle operation based on the comparing;
    determining a second graphic exemplifying the adjusted source vehicle operation; and
    displaying the second graphic upon a substantially transparent rear window display.

18. The method of claim 1 further comprising:
    monitoring source vehicle operation based on said monitored source vehicle information;
    monitoring a source vehicle location and orientation based on said monitored source vehicle information;
    determining a historical source vehicle operation profile based on said monitored source vehicle operation and said monitored source vehicle location and orientation; and
    comparing the historical source vehicle operation profile to a preferred source vehicle operation profile.

19. Method to dynamically register a graphic on a driving scene of a source vehicle utilizing a substantially transparent windscreen head-up display, comprising:
    monitoring source vehicle information comprising source vehicle health, source vehicle operation and a source vehicle location and orientation;
    monitoring a closed course specific geometry, closed course surface conditions and closed course traffic;
    monitoring a source vehicle occupant eye location;
    identifying a performance enhanced driving maneuver and a location of the performance enhanced driving maneuver based on said monitored source vehicle information and the monitored closed course specific geometry, closed course surface conditions and closed course traffic;
    determining a graphic exemplifying the performance enhanced driving maneuver;
    dynamically registering a location of the graphic upon the substantially transparent windscreen head-up display corresponding to the driving scene, the dynamically registered location based on the location of the performance enhanced driving maneuver and the source vehicle occupant eye location; and
    displaying the graphic upon the substantially transparent windscreen head-up display;
    wherein the substantially transparent windscreen head-up display comprises one of light emitting particles and microstructures over a predefined region of the windscreen permitting luminescent display while permitting vision therethrough.

* * * * *